United States Patent
West

(10) Patent No.: US 6,981,657 B1
(45) Date of Patent: Jan. 3, 2006

(54) APPARATUS FOR APPLYING FOAM MATERIAL TO A SUBSTRATE

(75) Inventor: Richard A. West, 31303 Nantucket Row, Bay Village, OH (US) 44140

(73) Assignee: Richard A. West, Bay Village, OH (US)

( * ) Notice: Subject to any disclaimer, the term of this patent is extended or adjusted under 35 U.S.C. 154(b) by 470 days.

(21) Appl. No.: 10/055,085

(22) Filed: Jan. 25, 2002

(51) Int. Cl.
*B05B 3/00* (2006.01)
*B05B 3/18* (2006.01)
*B05B 13/02* (2006.01)
*A01G 27/00* (2006.01)
*B05C 5/00* (2006.01)

(52) U.S. Cl. .......................... 239/227; 239/1; 239/67; 239/69; 239/264; 239/750; 239/752; 239/754; 118/305; 118/323

(58) Field of Classification Search ................ 239/227, 239/587.5, 750, 752, 753, 754, 264, 67, 69, 239/1; 118/305, 323
See application file for complete search history.

(56) References Cited

U.S. PATENT DOCUMENTS

| | | | |
|---|---|---|---|
| 3,548,453 A | 12/1970 | Garis | |
| 3,991,842 A | 11/1976 | Larsen | |
| 4,087,296 A * | 5/1978 | Hooker | 156/71 |
| 4,093,411 A | 6/1978 | Lee | |
| 4,209,557 A | 6/1980 | Edwards | |
| 4,333,973 A * | 6/1982 | Bellafiore et al. | 427/424 |
| 5,011,078 A * | 4/1991 | Eisterhold | 239/1 |
| 6,024,147 A | 2/2000 | Hunter, Jr. | |
| 6,036,123 A | 3/2000 | West | |
| 6,126,766 A * | 10/2000 | Hunter, Jr. | 156/78 |
| 6,358,344 B1 * | 3/2002 | Hunter, Jr. | 156/71 |
| 6,416,854 B2 * | 7/2002 | Hunter, Jr. | 428/319.1 |

* cited by examiner

*Primary Examiner*—David A. Scherbel
*Assistant Examiner*—Darren Gorman
(74) *Attorney, Agent, or Firm*—Fay, Sharpe, Fagan, Minnich & McKee, LLP

(57) ABSTRACT

A method and apparatus for depositing a layer of foamed plastic material on a roof surface and along a path thereon comprises controlling the movement of a spray applicator along the path such that the rate of movement of the applicator varies for a layer of foamed plastic material deposited on the roof surface to slope relative thereto along the path.

29 Claims, 3 Drawing Sheets

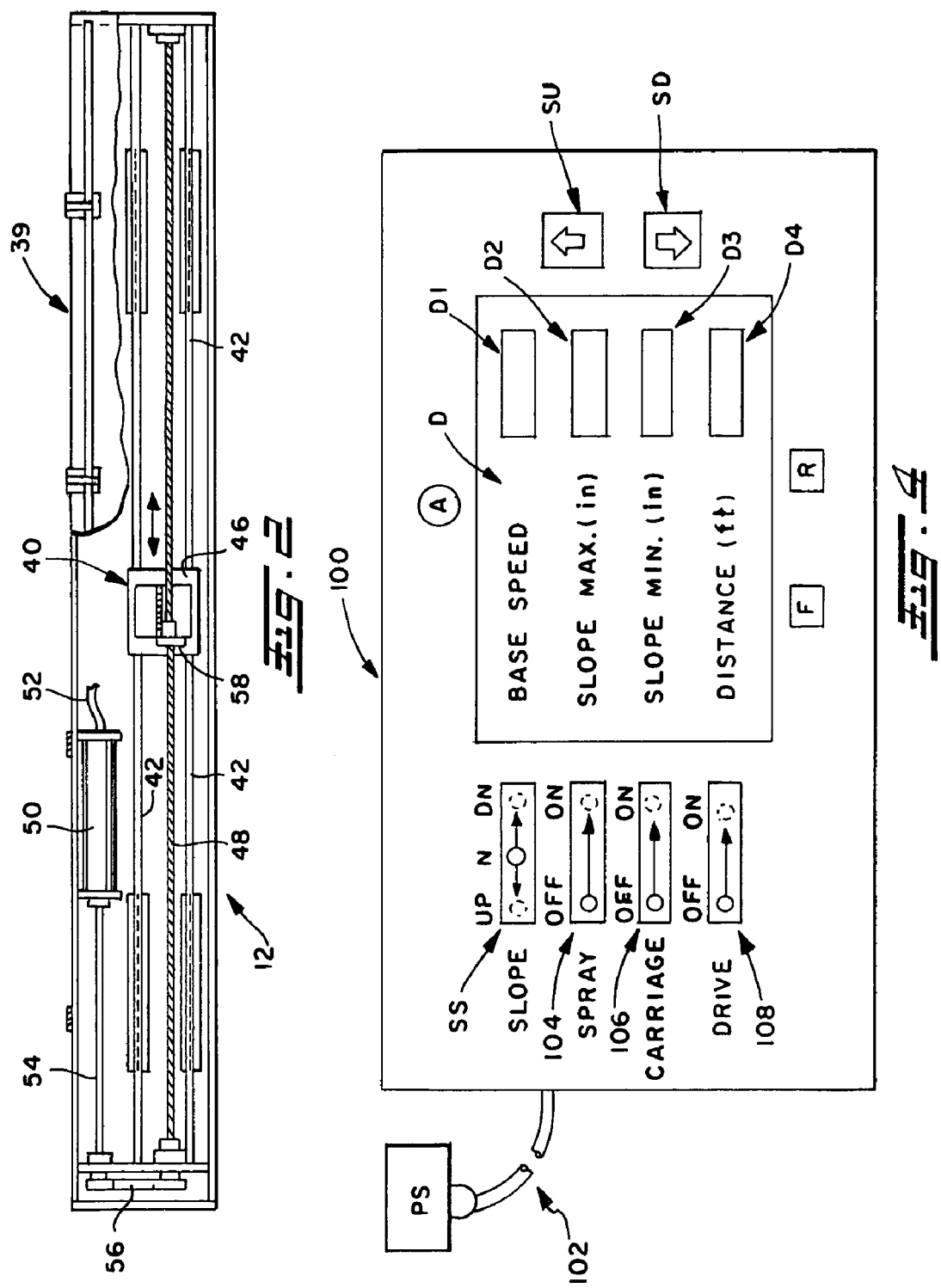

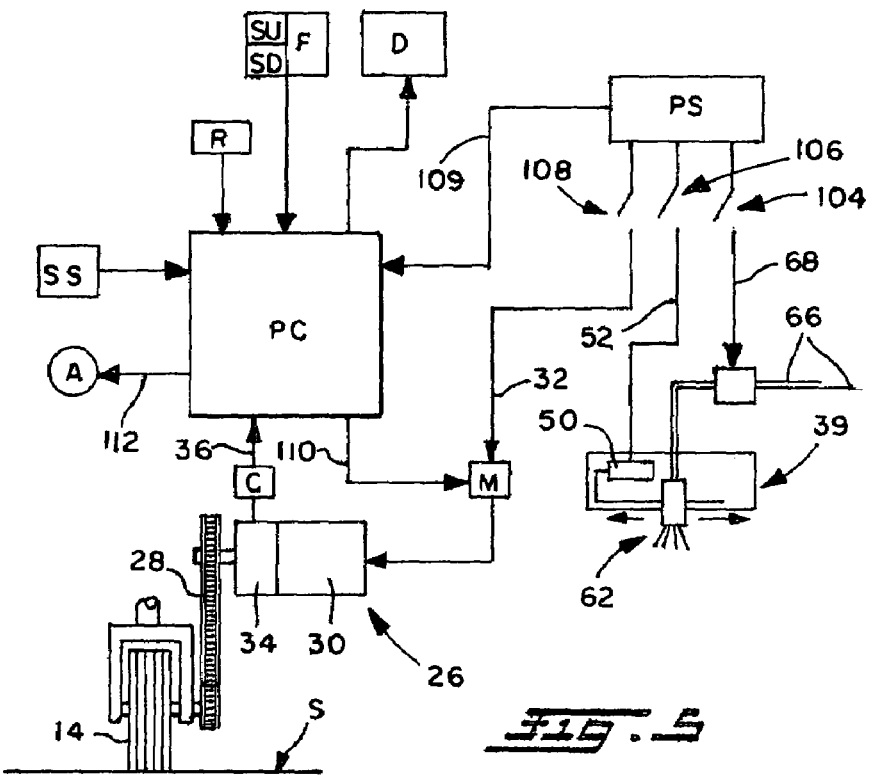
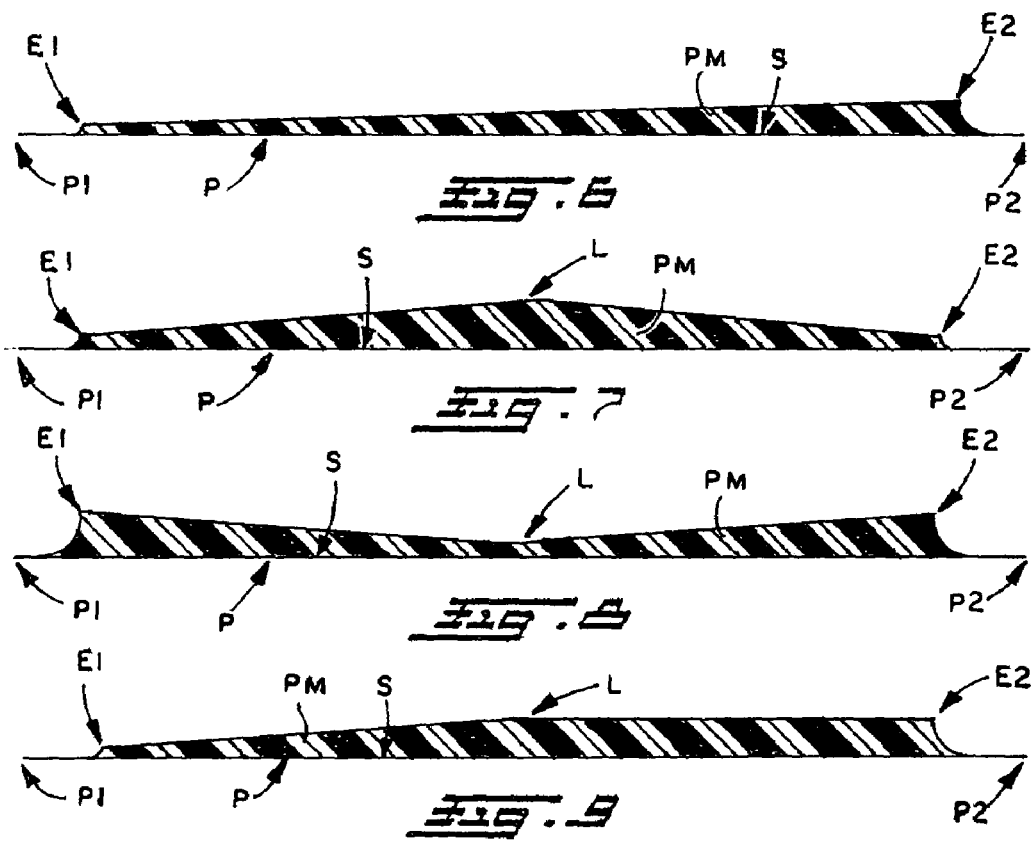

APPARATUS FOR APPLYING FOAM MATERIAL TO A SUBSTRATE

BACKGROUND OF THE INVENTION

This invention relates to the art of applying plastic foams to a substrate and, more particularly, to a method and apparatus by which the applied plastic foam has a sloping profile in the direction of along the path of application.

The invention finds particular utility in connection with the application of plastic foams to a roof deck and, accordingly, will be disclosed and described in detail herein in connection with such use. At the same time, however, it will be appreciated that the invention is applicable to the applying of plastic foam to substrates other than roof decks.

The spray application of plastic foams, such as polyurethane foams, to an underlying roof substrate is shown, for example, in U.S. Pat. No. 6,036,123 to West and in U.S. Pat. No. 6,024,147 to Hunter, the disclosures of which patents are hereby incorporated herein by reference. The apparatus in the West and Hunter patents comprises a wheeled frame moveable along a path and carrying a foamed plastic dispenser carriage extending transversely of the path and along which a foamed plastic dispenser is displaceable in opposite directions to spray foamed plastic material onto the roof substrate as the frame moves along the path. The frame is driven by an electric motor which, for any given pass along the path is operated at a constant speed which determines the thickness of a layer of the material deposited along the path between beginning and ending ends thereof.

As is well known, most commercial or industrial roofs are flat, whereby standing or ponding water is left in areas of the roof after a rain. Such standing or ponding water reduces the anticipated life of the roofing materials, adds weight to the roof deck, stresses the roof as a result of freezing and thawing cycles, breeds algae and other undesirable plant life, and attracts birds and other animals which drink the water, feed on the algae and the like. Moreover, many rooftop-mounted air-conditioning units draw outside air from the roof area, and algae or mold growth resulting from stagnant water on the roof surface has the potential for contaminating the air or producing an unpleasant odor within the building. Further, standing water makes maintenance of the roof and repairs thereto very difficult and creates an unsafe condition for maintenance personnel walking on the roof. Still further, in the event of a leak in the roof beneath an area of standing water, the potential for interior damage is greatly increased over that which might result from rain water running across the area but off the roof surface. The likelihood of ponding water increases as a building ages due to, for example, deflection in the roof deck, and the weight of standing or ponding water may increase to the point where it creates a safety hazard. For example, a 25,000 square foot roof with two inches of ponding water adds approximately 5,000 lbs. of weight to the roof deck. Moreover, the weight of standing water can crush the insulation located under the waterproofing membrane on the roof, thus reducing the R-value of the insulation and increasing the cost of heating and cooling the building. Crushing of the insulation can also increase the depth of the standing water and if the waterproofing membrane is breathable, such as silicone, acrylic or the like, the hydrostatic pressure of the standing water can saturate the underlying insulation. Standing water also adversely affects the adhesion of many protective coatings commonly used on flat roofs.

Heretofore, efforts to eliminate standing or ponding water and to produce positive water drainage on a flat roof surface have included the manufacturing of tapered insulation boards at a factory or the like, laying the boards out in multiple layers on a roof surface, and mechanically attaching the boards to the roof surface such as by screws and hold-down plates. The tapered boards are then covered with a water proofing membrane. This process is very labor intensive and expensive, and the cost is increased when laying the insulation boards over a roof deck which will not accept nails, such as concrete, gypsum and the like. Another effort, as shown in the patent to Hunter, involves the laying of multiple flat layers of polyurethane foam in which each of the layers is of uniform thickness relative to the underlying roof deck in the direction of application. Laterally adjacent ones of the layers are of different thickness relative to the deck, whereby the layers are terraced. This process is also time-consuming and thus expensive and, moreover, produces long lengths of flat surfaces which can be several feet wide, thus creating the potential for the undesired standing or ponding of water on the flat surfaces.

SUMMARY OF THE INVENTION

In accordance with the present invention, a method and apparatus is provided by which the foregoing and other problems encountered heretofore in connection with providing a sloped roof on a roof deck are overcome. More particularly in this respect, a layer of foamed plastic material is applied on an underlying surface in accordance with the present invention by depositing the foamed plastic material on the underlying surface in a given direction along a path and controlling the depositing of the material so that the deposited layer slopes relative to the underlying surface, either upwardly or downwardly in the direction of application. Advantageously, foamed plastic material deposited on a roof surface in accordance with the present invention enables sloping the roof surface as defined by the deposited material to slope upwardly from one side of a roof to the other, to slope downwardly from one side of a roof to the other, to slope upwardly and downwardly to the sides of the roof from a location therebetween, to slope downwardly and inwardly from the opposite sides toward a location therebetween, and to be of uniform thickness, either alone or in combination with one or more of the foregoing sloping profiles. Accordingly, the invention advantageously enables the roof surface defined by the deposited foamed plastic material to have a slope or slopes to accommodate the particular requirements of a given roof such as, for example, the location of existing draining points on an existing roof, or the location of designed draining points or channels in association with the construction of a roof. Accordingly, it will be appreciated that water from a rain will run along the sloping surface to a point of collection or drainage and will not stay on the roof surface so as to provide an area of ponding or standing water. Furthermore, a roof laid in accordance with the present invention promotes roof life by avoiding added weight thereon, stress resulting from freezing and thawing cycles and the adverse effects of water on the adhesion of protective coatings applied thereto. Moreover, a roof laid in accordance with the present invention avoids the accumulation of contaminants, algae and/or stagnant water and, thus, avoids the possibility of contaminating the air entering into an air-conditioning unit on the roof.

Preferably, the foamed plastic material is applied to an underlying roof surface in accordance with the invention through the use of apparatus such as that shown in the aforementioned patents to West and Hunter. More particularly in this respect, a programmable controller is provided in accordance with the invention by which the speed of the drive motor by which the apparatus is moved along a path on the underlying surface is controlled so as to enable the depositing of a layer of foamed plastic material which is inclined or sloped relative to the underlying roof deck. Preferably, the control provides for the selective application of the foamed plastic material in an upwardly sloping, downwardly sloping or no slope profile with respect to the direction of movement of the apparatus along the path and, preferably, the operator of the apparatus can change the profile of the deposited material during a given run along the path and without having to stop, adjust and restart the apparatus. Preferably in this respect, a control panel on the apparatus includes a selector control displaceable by the operator during movement of the apparatus along a path to provide for the deposited material to, selectively, slope upwardly, slope downwardly or not slope relative to the underlying roof surface. In accordance with another aspect of the invention, the control system is operable to determine the distance traveled by the apparatus along the path and to actuate a visual and/or audible alarm signal when a predetermined distance has been traveled. This is of particular advantage in connection with the laying of foamed plastic material using the apparatus shown in the West and Hunter patents wherein the operator is moving backwards along the path and, accordingly, has difficulty in observing the operation of the apparatus and, at the same time, being cognizant of the location of the roof edge behind him. When the alarm is actuated, indicating the end of a given pass, the operator turns the apparatus off to stop its advancement along the path.

It is accordingly an outstanding object of the present invention to provide a method and apparatus for covering an underlying roof substrate with foamed plastic material in a manner which provides a roof surface which is inclined or sloping relative to the underlying substrate.

Another object is the provision of a method and apparatus for applying foamed plastic material to an underlying roof substrate to provide a roof surface which eliminates standing or ponding water and promotes positive drainage of water from the roof.

A further object is the provision of a method and apparatus for providing a roof substrate with an overlying roof surface which is sloped or inclined relative thereto at a considerable savings in time and material with respect to the construction of such a roof surface with materials, methods and apparatus hereto available.

Yet a further object is the provision of apparatus for applying foamed plastic material to an underlying roof surface with a drive component which is controllable to vary the speed of movement of the apparatus along the underlying surface for the apparatus to deposit the foamed plastic material in a layer which is inclined or sloped relative to the underlying surface in the direction of movement of the apparatus therealong.

Another object is the provision of apparatus of the foregoing character wherein the control of the drive component provides for the deposited layer of material to, selectively, slope upwardly and/or slope downwardly and/or have no slope relative to the underlying surface.

Still a further object is the provision of apparatus of the foregoing character which is versatile in operation in connection with the laying of a layer of foamed plastic material on an underlying roof surface, and is easy to operate.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 2 is a plan view of the dispenser support and drive assembly of the apparatus;

FIG. 4 is a plan view of the operating control panel for the apparatus;

FIG. 5 is a block diagram of the circuitry for the programmable controller system for controlling operation of the apparatus; and, FIGS. 6–9 are longitudinal cross-sectional elevation views of the profiles of different runs of foamed plastic material deposited in accordance with the present invention.

DESCRIPTION OF A PREFERRED EMBODIMENT

Referring now in greater detail to the drawings, wherein the showings are for the purpose of illustrating a preferred embodiment of the invention only and not for the purpose of limiting the invention, apparatus for applying foamed plastic material on a roof substrate in accordance with the invention is illustrated in FIGS. 1–5. This apparatus, with the exception of the programmable control system to be described in detail hereinafter, structurally corresponds to the apparatus described in detail in the aforementioned West patent. More particularly in this respect, FIGS. 1–3 of the present application correspond, respectively, to FIGS. 1, 4 and 10 in the West patent. The apparatus will be described herein to the extent necessary to provide an understanding of the manner in which the apparatus operates in accordance with the present invention, and reference may be had to the West patent for further details regarding the apparatus.

Figure 1:
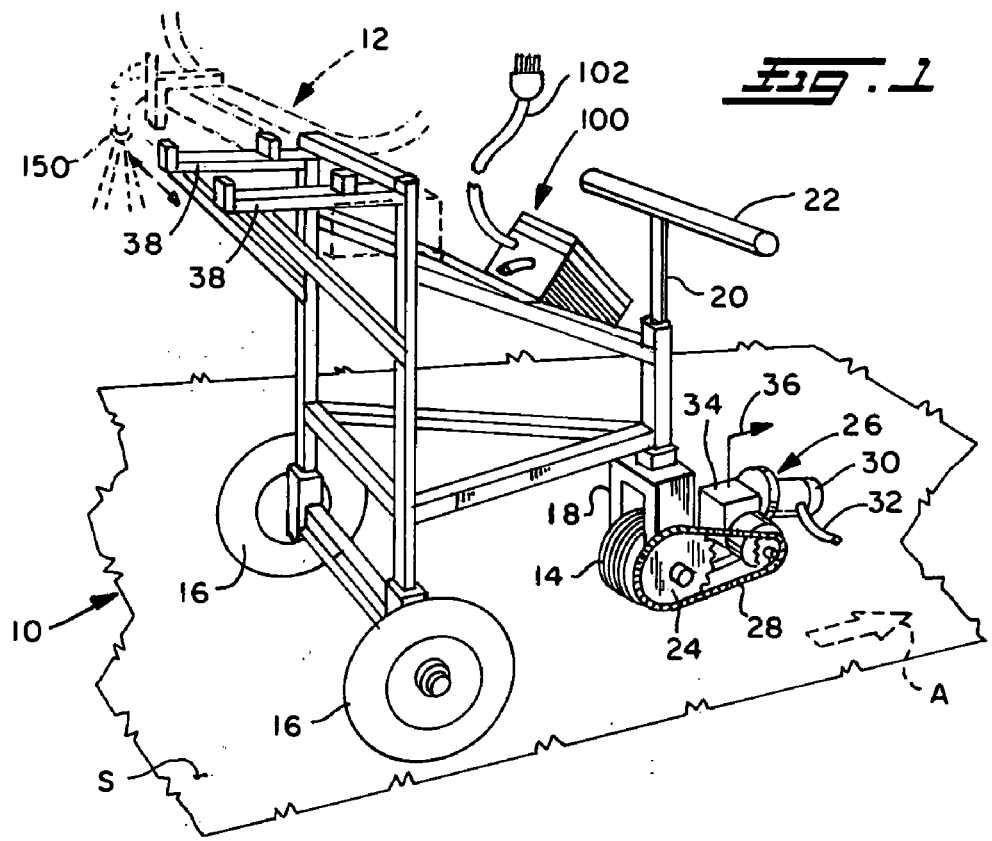
FIG. 1 is a perspective view of the wheeled frame of apparatus for depositing a layer of foamed plastic material on an underlying roof surface in accordance with the invention.
Figure 3:
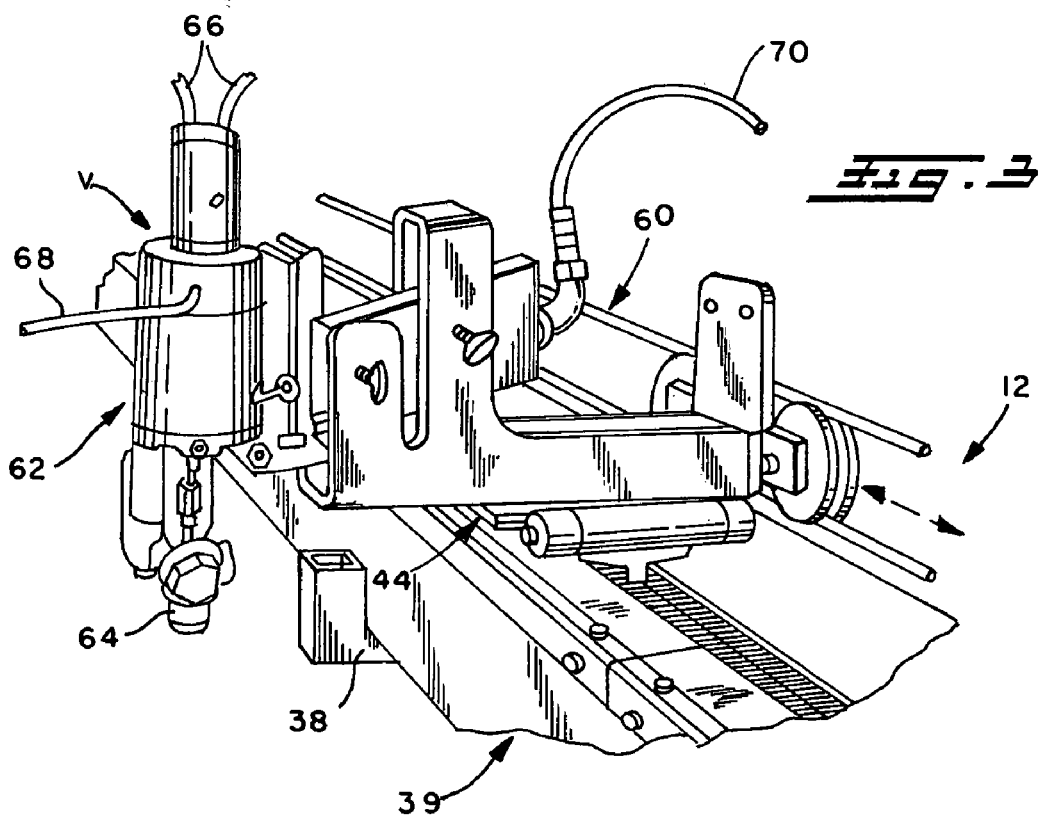
FIG. 3 is a perspective view of the dispenser mounting components showing a dispenser in the form of a dispensing gun.

Referring now to FIGS. 1–3, apparatus for applying foamed plastic material on a roof substrate comprises a wheeled frame 10 moveable along a path in a given direction A on an underlying roof deck substrate S, and a dispenser support and drive assembly 12. Frame 10 comprises a front wheel 14 and a pair of rear wheels 16 which support the frame for movement along roof substrate S, and front wheel 14 is pivotally mounted on the frame by a yoke 18 and a steering post 20 having a crossbar 22 at the upper end thereof by which an operator can pivot wheel 14 and thus control the direction of movement of the frame. Wheel 14 is provided with a drive sprocket 24 which is adapted to be driven by an electric motor and gear reduction unit 26 through a sprocket chain 28. Unit 26 includes a variable speed electric motor 30 having a power cord 32, and a gear reducer 34 which, in the manner and for the purpose set forth more fully hereinafter, outputs a control signal through line 36 indicative of an increment of distance of travel of the apparatus along surface S.

Dispenser support and drive assembly 12 rests on cradle arms 30 which extend rearwardly of frame 10 and comprises an elongate housing 39 which, when mounted on frame 10, extends transverse to the direction of movement A thereof along surface S. Dispenser support and drive assembly 12 further includes a carriage 40 which is supported for reciprocation in opposite directions of the housing along a linear carriage path defined in part by carriage track rod members 42. A dispenser mounting plate assembly 44 is mounted on carriage 40 for movement therewith along the carriage path, and carriage 40 includes a base member 46 having track openings therethrough which receive rods 42 and support the carriage for sliding movement therealong. Carriage 40 is adapted to be driven in opposite directions along the linear carriage path defined by rods 42 by a threaded drive shaft 48 extending between the opposite ends of the carriage housing and a carriage drive motor 50 mounted in the housing. Motor 50 is a reversible electric motor having power input through line 52 and the motor has an output shaft 54 drivingly interconnected with carriage drive shaft 48 through a pulley and drive belt arrangement including an endless belt 56. Drive shaft 48 is drivingly interconnected with carriage 46 by an internally threaded drive coupling 58 on the carriage. Accordingly, it will be appreciated that rotation of drive shaft 48 in one direction about its axis displaces carriage 46 in one direction along the carriage path and that rotation of the drive shaft in the opposite direction displaces the carriage in the opposite direction along the carriage path. Reversal of the direction of rotation of carriage drive motor output shaft 54 is controlled by a pair of micro switches, not shown, located in housing 39 at opposite ends of the carriage path.

Dispenser mounting plate assembly 44 includes a dispenser mounting bracket 60 which removably supports a foamed plastic dispenser 62 in the form of a dispensing gun which, in the embodiment illustrated, is a hand-held spray gun such as that available from Gusmer Corporation of Lakewood, New Jersey under the latter's product designation Model GX7. Such a spray gun has an outlet nozzle 64 for discharging expandable plastic foam material downwardly toward substrate S in a spray pattern which is in a vertical plane transverse to the direction of the carriage path. The dispensing gun is connected in a well-known manner by hoses 66 to suitable dispensing equipment by which component materials of the foamed plastic are heated and delivered to the dispenser for mixing therein and dispensing therefrom through nozzle 64. The dispenser is electrically operated such as through a solenoid valve V connected to a suitable power source by line 68, and the operation thereof is controlled by the operator of the apparatus as set forth more fully hereinafter.

As will be appreciated from the description thus far, carriage drive motor 50 operates to rotate carriage drive shaft 48 so as to displace carriage 40 and thus the dispensing gun along the carriage path and between direction reversing locations along the path at which the direction of displacement of the carriage and thus the foam dispensing gun is reversed. Reciprocating displacement of the dispensing gun in opposite directions is continuous whereby, in connection with displacement of frame 10 along a path on an underlying substrate, foamable plastic material is progressively applied to the substrate behind the moving frame and along the path, and the applied material has a width determined by the direction reversing locations on the dispenser support and drive assembly.

Frame 10 of the apparatus also supports a control panel 100 which is adapted to be connected to a suitable power source PS of 110 volt electrical power by a cord 102 and which control panel is interconnected with frame drive motor 30, carriage drive motor 50, and the control valve of dispensing gun 62 such that an operator of the apparatus can control the functions thereof in connection with the application of foamed plastic onto substrate S. More particularly in this respect, as will be appreciated from FIGS. 4 and 5, the control panel is provided with a spray controller which can, for example, be in the form of a switch 104 in line 68 from the power source to a solenoid valve V which controls the flow of chemicals to foamed plastic dispenser 62. Alternatively, and equally applicable where the chemical flow control valve is air actuated, the flow controller is a valve having an "on" and "off" operating member on the control panel for controlling the flow of air to the chemical flow control valve. The control panel also includes a carriage switch 106 in line 52 between the power source and carriage drive motor 50, and a drive switch 108 in line 32 between the power source and the apparatus or frame drive motor 30. Switches 104, 106 and 108 can be toggle switches having OFF and ON positions, as shown, although it will be appreciated that rotary, push button or other switches can be used. Further, it will be appreciated that the ON and OFF positions respectively close and open the switches.

In accordance with the present invention, control panel 100 further includes a control system for drive motor 30 including a programmable controller PC connected to power supply PS by line 109. Controller PC is operable to control the speed of motor 30 in accordance with inputted parameters for a given run of the apparatus along surface S. Every spray dispensing device, such as the spray gun identified herein, has its own operating characteristics which depend, for example, on variables such as the supply pressure for the chemicals, the density of the foamed plastic material and the like, and the controller is programmed so that the control of drive motor 30 assures the appropriate speed for the apparatus required to deposit the foamed plastic material on substrate S to obtain the desired profile based on the inputted parameters for the given run. These input parameters include the base speed for the apparatus to lay a layer of foam one inch thick, the distance for the run in feet, and slope parameters including the maximum thickness of the deposited material in inches and the minimum thickness of the material in inches. With these parameters inputted into the controller, the controller is operable as set forth hereinafter to vary the speed of drive motor 30 so as to achieve the desired slope of the material over the inputted distance of the run.

As shown in FIG. 4, control panel 100 includes a flat panel display D, which may, for example, be an LCD panel. Panel D has individual display areas D1, D2, D3, and D4 which respectively display the Base Speed, Slope Max (in), Slope Min (in), and Distance (ft) when the four parameters are inputted as set forth hereinafter. Controller PC has an internal battery for maintaining information in memory, including the current settings for the four parameters. The control panel further includes a push button function switch F, a push button reset switch R, a push button scroll-up switch SU, a push button scroll-down switch SD, and a toggle-type slope selector switch SS, which has UP, DN and N positions for the purpose set forth hereinafter. As shown in FIG. 5, the control circuitry further includes a motor controller M in line 32 between switch 108 and drive motor 30, and a counter C in line 36 between gear reducer 34 and the programmable controller.

Motor controller M is operable to vary the speed of drive motor 30 in accordance with an input signal thereto from controller PC through line 110, and counter C is operable to input a signal to controller PC indicative of the distance of movement of the apparatus along underlying surface S. Numerous counting devices are available for this purpose and, in the present embodiment, the counter is a magnetic proximity switch mounted in the gear reducer which outputs a signal to controller PC through line 36 a number of times for each revolution of tire 14. In the disclosed embodiment, controller PC receives an input signal from the counter for every 2.3 inches of movement of the apparatus along surface S. Finally, controller PC outputs a signal through line 112 to an alarm device A when the apparatus has traveled along surface S the predetermined distance inputted to the controller. Alarm A can provide an audio and/or a visual signal and, in any event, indicates to the operator that the apparatus has moved the set distance, whereby the operator can control the apparatus accordingly, as will become apparent hereinafter.

In the embodiment disclosed herein, the base speed for laying a one-inch layer of foam is the reference point or input signal upon which controller PC is programmed to control drive motor 30 according to the inputted distance and minimum and maximum thicknesses parameters for a given run. The base speed is a numerical input to the controller between 1 and 999, and the base speed for a given polyurethane foam and a given spray dispensing device is initially established by trial and error. In this respect, for example and in the manner which will become apparent hereinafter, the operator will set the base speed at 800 and the thickness to be laid at one inch, run the apparatus a short distance and then measure the thickness. If necessary, the base speed input will be adjusted and the apparatus again moved a short distance. This procedure generally takes less than a half hour and, once the base speed is determined, it remains the same for the given apparatus and foam.

The foam depositing apparatus is operable, as shown in FIG. 6-9 for example, and as described below, to deposit a layer of foamed plastic material PM along a path P having a beginning end P1 and an ending end P2 such that the material is deposited along a portion of the path having a starting end E1 and a stopping end E2, and the controller PC is operable to control the speed of movement of the apparatus along path P for the deposited material to have a profile which is inclined and/or flat relative to the underlying surface S in the direction of movement along path P. More particularly with regard to the use of controller PC and operation of the foam depositing apparatus under the control thereof, plugging cord 102 into power supply PS activates the controller whereupon display panel D is illuminated and the base speed, slope and distance parameters appear on the screen with the current settings therefor. At this time, the Spray, Carriage and Drive Switches, 104, 106 and 108, respectively, are in the OFF or open position. Presuming that the operator wants to deposit a thirty foot run of the foamed plastic material PM having the profile shown in FIG. 6 and having a minimum thickness of one inch at starting end E1 and sloping up to a maximum thickness at stopping end E2, and further presuming that these are different parameters from those currently showing on display panel D, and that the operator wants to check the base speed setting to be sure that the setting is correct for laying one inch of foam, the operator depresses reset switch R which clears the display areas D1-D4. The operator then depresses the function switch F which brings up the Base Speed display area D1 and depresses the appropriate scroll switch SU or SD to bring up, for example, 800 into the display area. The operator then depresses the function switch F to set the base speed and to enter the same into controller PC. The operator then depresses function switch F which brings up the Slope Max display area D2, and depresses the appropriate scroll switch SU or SD to bring the desired one inch maximum thickness of the deposited layer into display area D2. The operator then depresses function switch F to set the Slope Max figure in display area D2 and enter the same into the controller PC. The operator then depresses function switch F which brings the Slope Min to display area D3, whereupon the operator depresses the appropriate one of the scroll switches SU and SD to bring the desired one inch minimum thickness number into area D3. The operator then again depresses function switch F to set the Slope Min number in display area D3 and enter the number into controller PC. The operator then operates the apparatus as set forth hereinafter to spray foam onto substrate S for a short distance and, presuming that the selected base speed of 800 results in laying a one inch layer of foam, the apparatus is ready to be set to lay the above described run of thirty feet. The operator then depresses function switch F the number of times necessary to bring up the Slope Max display area D2, and depresses scroll switch SU to bring the desired two inch maximum thickness of the deposited layer into display area D2. The operator then depresses function switch F to set the Slope Max figure in display area D2 and enter the same into controller PC. Finally, the operator depresses function switch F to bring up the Distance display area D4, whereupon the appropriate one of the scroll switches SU and SD is depressed to bring the desired thirty feet distance number into display area D4. Function switch F is then depressed by the operator to set the latter number in display area D4 and enter the number into the controller. The operator then displaces Slope switch SS to the UP position thereof, and with base speed and thickness parameters and the slope direction inputs to controller PC, the latter will initiate operation of the apparatus at the base speed and, as set forth hereinafter will control drive motor 30 so as to reduce the speed to the numerical value of 400 at the end of the run, thus to incline the layer of deposited material from one inch to two inches.

To deposit the described run, the operator positions the apparatus so as to move along path P from end P1 toward end P2 thereof, and places the apparatus into the position at which depositing of the foamed plastic material is to start, namely end E1 of the layer to be deposited. The operator then, sequentially, closes Carriage switch 106 to actuate carriage drive motor 50 and reciprocate the carriage laterally, closes Spray switch 104 to initiate the spraying of foamed plastic material through dispensing gun 62, and closes Drive switch 108 to actuate drive motor 30, whereupon the apparatus begins to move along path P toward end P2 thereof. As the apparatus moves along path P, counter C intermittently outputs signals to controller PC through line 36 indicative of the linear displacement of the apparatus along the path, and the controller, in response to such signals, intermittently outputs signals through line 110 to motor controller M, whereby the speed of motor 30 is progressively reduced as the apparatus moves along path P towards end P2 thereof to progressively increase the thickness of material PM. When the apparatus has traveled the set distance of 30 feet, corresponding to stopping end E2 for the deposited layer, alarm A is actuated and the operator, sequentially, opens Spray switch 104 to stop the dispensing of material, opens Carriage switch 106 to de-energize carriage drive motor 50, and opens Drive switch 108 to de-energize drive motor 30 for the apparatus. At this point, the apparatus has been operated to deposit a layer of material PM having a thickness of one inch at starting end E1 thereof and which progressively slopes upwardly relative to surface S to have a thickness of two inches at stopping end E2.

The operator can then position the apparatus to be laterally adjacent to the applied layer at end P2 of the path and, by changing Slope switch SS from the UP to the DN position thereof, set the apparatus to lay a layer of material PM in the direction from end P2 of the path towards end P1 with an initial thickness of two inches at end E2 and one inch at end E1. In this respect, when Slope switch SS is changed from the UP to the DN position the controller, together with the previously inputted Slope Max, Slope Min and Distance data and the ending Base Speed of 400 is operable to control the speed of motor 30 to progressively increase to 800 during laying of the second layer of material PM. Once set in the foregoing manner, the operator sequentially displaces Carriage switch 106 to the ON position thereof, displaces Spray switch 104 to the ON position thereof, and displaces Drive switch 108 to the ON position thereof to start the spray deposition and initiate movement of the apparatus in the direction from end P2 towards end P1 of the path. At end E1, alarm A is actuated and the operator shuts down the apparatus as described above.

FIG. 7 illustrates a profile of the deposited material PM in which the layer of material slopes up from starting end E1 to a location L and thence slopes down from location L to end E2 of the layer. Assuming the distance between the starting and stopping ends E1 and E2 to be 30 feet, and the slope to be from one inch at end E1 to two inches at location L and one inch at end E2, function switch F is depressed to bring the Distance parameter up on the display panel and, presuming the previous setting to be 30 feet, scroll switch SD is depressed to change the distance reading to 15 feet. Slope switch SS is then displaced to the UP position and, based on the inputted data, controller PC is set to control the speed of drive motor 30 for the layer of material PM to have a thickness of one inch at end E1 and a thickness of two inches at location L. The operator then initiates starting of the apparatus as described above and, when the apparatus reaches location L, alarm A is actuated and, without stopping the apparatus, the operator switches slope switch SS from the UP to the DN position. In response to the latter, controller PC controls the speed of motor 30 for the layer of material PM to slope downwardly from location L to end E2 of the layer and to have a thickness of one inch at the latter end. Again, the apparatus can be positioned laterally adjacent the deposited layer at end E2 thereof for depositing a second layer in the direction from end P2 to end P1 of path P.

FIG. 8 illustrates a profile of deposited material PM which is basically a reversal of the profile illustrated in FIG. 7. In this respect, the deposited material slopes down from end E1 to location L and then slopes up from the latter location to end E2. It will be appreciated from the foregoing description that in depositing the layer shown in FIG. 8, Slope switch SS is initially displaced to the DN position thereof and, in location L and in response to actuation of alarm A, switch SS is displaced to the UP position for the remainder of the run. Again, at end E2 the alarm is actuated and the operator shuts down the apparatus as previously described.

FIG. 9 illustrates a deposited layer of material PM which slopes up from starting end E1 to location L and then remains of uniform thickness from location L to stopping end E2. In this instance, the apparatus is set as described in connection with the profile shown in FIG. 7 and, at location L and in response to traveling the input distance, the controller stops adjusting the speed of motor 30 and the latter operates at the same speed thereafter such that the deposited layer PM from location L to end E2 is of uniform thickness relative to the underlying surface S. At end E2, the operator shuts down the apparatus as described above.

It will be appreciated from the foregoing description of the operation of the apparatus and controller PC in the depositing of layers of material PM having the various profiles shown in FIGS. 6-9 that the apparatus and controller are operable to deposit material in other profiles than those shown. In this respect, for example, an area of uniform thickness can be interposed between the upwardly and downwardly sloping portions of the deposited layers shown in FIGS. 7 and 8. Moreover, Slope switch SS can be placed in the N position thereof whereby the apparatus moves at the base speed to deposit a layer of material PM which is one inch between ends E1 and E2. If it is desired to lay a layer of uniform thickness greater than one inch, then the Slope Max and Slope Min can both be set to the same thickness, as when setting and checking the base speed as described herein. While the examples illustrated and described herein are with reference to thickness parameters of one and two inches and a length of 30 feet, it will be appreciated that the controller can be programmed to operate over a range of thicknesses from less than one inch to greater than two inches and over a range of distances from less than to greater than 30 feet. From a practical standpoint, the thickness of the deposited material will generally be no less than one-half inch and no more than four inches, and the distance can be more than one hundred feet. Further, the deposited material will reach the selected thickness at the starting end of a run within the first four inches of travel of the apparatus.

While considerable emphasis has been placed herein on the preferred embodiment, it will be appreciated that any embodiments of the invention can be made and that many changes can be made in the embodiment herein illustrated and described without departing from the principals of the invention. Accordingly, it is to be distinctly understood that the foregoing descriptive matter is to be interpreted merely as illustrative of the invention and not as a limitation.

What is claimed is:

1. In apparatus comprising depositing means for depositing a layer of foamed plastic material on an underlying roof surface along a run of a path having a beginning end and an ending end, support means for supporting said depositing means for movement on said underlying surface along said path, moving means for moving said support means along said path, and control means for controlling said moving means, the improvement comprising: said control means including means controlling said moving means for varying the rate of movement of said support means along said run of said path for a layer of foamed plastic material deposited on said underlying surface to slope uniformly relative thereto along at least a portion said run of said path between said beginning end and said ending end.

2. Apparatus according to claim 1, wherein said moving means includes an electric drive motor.

3. Apparatus according to claim 1, wherein said moving means includes a variable speed drive motor and said control means includes means for progressively changing the speed of said motor during movement of said support means along said portion of said path.

4. Apparatus according to claim 3, wherein said means for progressively changing the speed of said motor progressively increases the speed thereof.

5. Apparatus according to claim 3, wherein said means for progressively changing the speed of said motor progressively decreases the speed thereof.

6. Apparatus according to claim 3, wherein said means for progressively changing the speed of said motor includes means for, selectively, progressively increasing and progressively decreasing the speed thereof.

7. Apparatus according to claim 1, wherein said support means includes a plurality of wheels and said moving means includes an electric motor for driving at least one of said wheels.

8. Apparatus according to claim 7, wherein said moving means includes a variable speed drive motor and said control means includes means for progressively changing the speed of said motor during movement of said support means along said portion of said path.

9. Apparatus according to claim 8, wherein said means for progressively changing the speed of said motor includes means for, selectively, progressively increasing and progressively decreasing the speed thereof.

10. Apparatus according to claim 8, wherein said means for progressively changing the speed of said motor progressively increases the speed thereof.

11. Apparatus according to claim 8, wherein said means for progressively changing the speed of said motor progressively decreases the speed thereof.

12. Apparatus according to claim 8, wherein said depositing means includes a foam material dispenser and means for displacing said dispenser relative to said support means in laterally opposite directions relative to said path.

13. Apparatus according to claim 12, wherein said means for progressively changing the speed of said motor includes means for, selectively, progressively increasing and progressively decreasing the speed thereof.

14. Apparatus according to claim 1, wherein said moving means includes a variable speed drive motor and said control means includes means for, selectively, progressively increasing, progressively decreasing, and maintaining a uniform speed for said motor during movement of said support means along said path.

15. A method of applying a layer of foamed plastic material on an underlying roof surface along a run of a path having a beginning end and an ending end, comprising depositing foamed plastic material on said surface in the direction from said beginning end toward said ending end of said run of said path, and controlling the depositing of material for the deposited material to slope uniformly relative to said surface along at least a portion of said path between said beginning end and said ending end.

16. The method according to claim 15, and controlling the depositing for said material to progressively increase in thickness relative to said surface along said portion of said path.

17. The method according to claim 15, and controlling the depositing for said material to progressively decrease in thickness relative to said surface along said portion of said path.

18. The method according to claim 15, wherein said portion of said path has a starting end and a stopping end, and controlling the depositing for said material, selectively, to one of progressively increase in thickness and progressively decrease in thickness from said starting end to a location between said starting end and said stopping end and then to the other of progressively increase in thickness and progressively decrease in thickness from said location to said stopping end.

19. The method according to claim 18, and controlling the depositing for said material to progressively increase in thickness from said starting end to said location.

20. The method according to claim 18, and controlling the depositing for said material to progressively decrease in thickness from said starting end to said location.

21. The method according to claim 15, and controlling the depositing of material for the material to have a uniform thickness relative to said surface along another portion of said path.

22. The method according to claim 15, including the further steps of providing a spray applicator for said foamed plastic material, moving said spray applicator along said path in the direction from said beginning end toward said ending end, and reciprocating said applicator in laterally opposite directions relative to said path during said moving.

23. The method according to claim 22, wherein said spray applicator is on a wheeled support including a variable speed motor for moving the support along said path, and varying the speed of said motor during movement of said support along said portion of said path.

24. The method according to claim 23, and, selectively, one of increasing and decreasing the speed of the motor during movement of said support along said portion of said path.

25. The method according to claim 24, and the other of increasing and decreasing the speed of the motor during movement of said support along another portion of said path.

26. The method according to claim 25, and maintaining a uniform speed of said motor during movement of said support along a further portion of said path.

27. The method according to claim 23, wherein said portion of said path is a first portion, and maintaining a uniform speed of said motor during movement of said support along a second portion of said path.

28. The method according to claim 27, and varying the speed of said motor during movement of said support along a third portion of said path.

29. The method according to claim 15, wherein said portion of said path has a starting end and a stopping end, and controlling the depositing for said material, selectively, to one of progressively increase in thickness, progressively decrease in thickness, and be of uniform thickness from said starting end to said stopping end.

* * * * *